United States Patent
Jonsson

(10) Patent No.: US 8,388,764 B2
(45) Date of Patent: Mar. 5, 2013

(54) APPARATUS AND METHOD FOR HANDLING AN ARTIFICIAL TURF ARRANGED ON A BASE

(75) Inventor: Ingemar Jonsson, Södra Sandby (SE)

(73) Assignee: SYDVAC, Sodra Sandby (SE)

( * ) Notice: Subject to any disclaimer, the term of this patent is extended or adjusted under 35 U.S.C. 154(b) by 732 days.

(21) Appl. No.: 12/457,719

(22) Filed: Jun. 19, 2009

(65) Prior Publication Data

US 2010/0001115 A1   Jan. 7, 2010

(30) Foreign Application Priority Data

Jun. 19, 2008   (SE) ........................ 0801443

(51) Int. Cl.
- B08B 3/04 (2006.01)
- B08B 3/00 (2006.01)
- B08B 3/12 (2006.01)
- B08B 6/00 (2006.01)
- C23G 3/02 (2006.01)
- B21B 45/02 (2006.01)
- G03D 3/13 (2006.01)

(52) U.S. Cl. ................. 134/122 R; 134/104.2; 134/124; 134/125; 134/131; 134/133; 134/137; 134/151; 134/165; 134/198; 134/199; 134/201

(58) Field of Classification Search ............... 134/104.2, 134/122 R, 124, 125, 131, 133, 137, 151, 134/165, 198, 199, 201
See application file for complete search history.

(56) References Cited

U.S. PATENT DOCUMENTS

| | | | |
|---|---|---|---|
| 2,998,081 A | 8/1961 | Hartmangruber et al. |
| 4,084,763 A | 4/1978 | Zamboni |
| 4,738,407 A | 4/1988 | Arrant |
| 5,743,043 A | 4/1998 | Habenicht et al. |
| 2006/0039754 A1 | 2/2006 | Linville |

FOREIGN PATENT DOCUMENTS

| | | |
|---|---|---|
| DE | 82 18 929 | 2/1983 |
| EP | 0 185 646 | 6/1986 |
| EP | 185646 A * | 6/1986 |
| JP | 60226906 | 11/1985 |
| JP | 12-14558 | 8/1989 |
| JP | 11-293618 | 10/1999 |
| JP | 11293618 A * | 10/1999 |

(Continued)

OTHER PUBLICATIONS

International Search Report dated Dec. 12, 2008. European Search Report, Jul. 10, 2009.

Primary Examiner — Michael Barr
Assistant Examiner — Charles W Kling
(74) Attorney, Agent, or Firm — Harness, Dickey & Pierce, P.L.C.

(57) ABSTRACT

An apparatus is disclosed for handling an artificial turf arranged on a base. In at least one embodiment, the apparatus includes a removing station for lifting from the base a strip of the artificial turf extending in a longitudinal direction, a separating station for separating filling material from the strip and a winding station for winding the strip onto a shaft. A method is disclosed for handling an artificial turf arranged on a base. In at least one embodiment, the method includes lifting a strip of the artificial turf extending in a longitudinal direction from the base, separating infill material from the strip and winding the strip onto a shaft.

13 Claims, 6 Drawing Sheets

FOREIGN PATENT DOCUMENTS

| | | |
|---|---|---|
| JP | 2000-008314 | 1/2000 |
| JP | 2000008314 A * | 1/2000 |
| KR | 890002840 | 6/1983 |
| NL | DE 94 09 749.6 | 11/1994 |
| NL | 1032985 | 6/2008 |
| WO | WO 03/025288 | 3/2003 |
| WO | WO 2010/094576 | 8/2010 |

* cited by examiner

APPARATUS AND METHOD FOR HANDLING AN ARTIFICIAL TURF ARRANGED ON A BASE

PRIORITY STATEMENT

This application claims benefit under 35 U.S.C. §119 to Swedish Patent Application No. 0801443-3, filed on Jun. 19, 2008 in the Swedish Patent Office, the disclosure of which is incorporated herein in its entirety by reference.

TECHNICAL FIELD

The present invention relates to an apparatus and a method for handling an artificial turf arranged on a base.

BACKGROUND ART

Artificial grass is commonly used, for instance, on football, baseball and land hockey pitches, but can be seen more and more also on golf and tennis courts and in other places such as gardens, terraces and patios. Artificial grass is advantageous since, contrary to natural grass, it does not require watering in summer and does not freeze in winter. Moreover, artificial grass does not need fertilizing, mowing or airing.

Artificial turf consists, for example, of a combination of a mat of filaments and an infill material. The infill material can be, for example, different combinations of sand, crushed rubber (e.g. ground tires) and plastic granules.

To install the artificial turf, strips of the mat are rolled out on a base, such as a field or pitch. The strips of mat are glued together using, for instance, adhesive strips which are disposed underneath the strips. After the mats have been rolled out and glued together the infill material is distributed across the mat. If a mat with divisible grass filaments is used, such as a "split-fibre mat", the grass is brushed in such a manner that the grass filaments are split. If a "monosplit mat" is used, a filament can be split into, for example, 1-7 filaments, and if a "full split mat" is used a filament can be split into, for example, 8-15 filaments.

For football field grass, in particular artificial grass, to be used on fields intended for international games it must meet certain quality requirements and must satisfy the standards imposed by, for instance, FIFA (Federation Internationale de Football Association) and UEFA (Union of European Football Associations). When the artificial turf is worn out and no longer meets these requirements, which may be the case already after a year, it must be replaced by a new artificial turf. Another reason for removing the artificial turf may be that the field needs to be relocated because the land is to be used for other purposes, for example for a housing project. Yet another reason may be that the artificial turf has been installed in an inappropriate location where, for example, ground drainage is poor.

Since artificial turfs represent a considerable investment, it is desirable to be able to reuse artificial turf which, for instance, does not meet the requirements for international events, but which might be used in other contexts. In certain cases, the infill material too can be reused. Even if the infill material is not reused, it is still desirable to separate it from the artificial turf in order to save the costs for the controlled dumping of the infill material.

There are many problems associated with the removal of artificial turf. Typically, the infill material is distributed in such a manner that the weight distribution is approximately 30 kg/m². One roll of artificial grass, i.e. one strip of turf, can weigh approximately one metric ton and the infill material that is distributed over a strip of turf can weigh approximately ten metric tons.

Thus, one way of removing the turf would be to cut it into smaller pieces, which are easier to handle. A problem with this solution, however, is that it is very difficult to put these little pieces back together again, which complicates the reuse of these pieces to form a new artificial turf.

Another way of making the artificial turf lighter is to remove the infill material at an initial stage by means of, for example, an apparatus similar to the sweeping vehicles that are used for sweeping the streets. A drawback of this solution, however, is that the infill material whirls up into the air when brushed off, which may cause it to spread through the air and settle in the stands necessitating cleaning of the stands; it may also inconvenience the staff carrying out the sweeping. A further drawback of this solution is that it is not possible to remove all of the infill material from the mat and if the sweeping vehicle makes several runs across the artificial turf the filaments will be damaged, which will make further reuse of the artificial turf impossible.

Consequently, the removal of artificial turf is highly problematic and the lack of satisfactory solutions is evident.

SUMMARY OF THE INVENTION

In view of the above, it is an object of the present invention to provide an apparatus and method for handling an artificial turf arranged on a base.

To achieve this object, and also other objects that will be evident from the following description, it is suggested according to the present invention an apparatus and a method as defined in the respective independent claims. Embodiments of the apparatus and the method will be apparent from the dependent claims and from the following description and the appended drawings.

More specifically, the present invention suggests an apparatus for handling an artificial turf, comprising a separating station for separating infill material from the artificial turf. The separating station comprises a guide roller, over which a strip of the artificial turf is to be passed to allow the infill material to be separated from the strip by means of gravitation, and at least one of engagement means for separating the infill material from the strip through mechanical engagement with the strip, the engagement means being arranged adjacent to the guide roller and adapted to engage with the underside of the strip to cause the infill material to dislodge, brush means for separating the infill material from the strip by engaging with the upper side of the strip, the brush means being arranged adjacent to the guide roller, and nozzles for separating the infill material from the strip, the nozzles being positioned adjacent to the guide roller and arranged to direct air jets at the guide roller.

The inventive separating station ensures that the infill material can be separated from the artificial turf in a very simple, smooth and cost-effective manner.

Such a design of the nozzles, the engagement means and the brush means is advantageous in that it facilitates the separation of the infill material from the strip. This embodiment is particularly advantageous if the infill material is moist or if the artificial turf is of the type having divisible grass filaments.

According to one embodiment, the guide roller can be arranged to act on the strip, such that the portion of the strip that at any given moment contacts the guide roller is opened up, that is the filaments of the strip are angled away from each other allowing the infill material to fall from the strip under the influence of gravitation.

Such a design of the guide roller is advantageous in that it facilitates the separation of the infill material from the strip.

According to one embodiment, the engagement of the guide roller with the strip can be adjustable for enabling setting of the degree to which the strip is opened up.

Such a design of the guide roller is advantageous in that it allows the degree to which the strip is opened up to be adapted to, for example, the filament density, the kind of infill material used and the moisture of the infill material.

According to one embodiment, the engagement means can comprise a rotatably arranged girder structure.

Such a design of the engagement means is advantageous in that it facilitates the separation of the infill material from the strip.

According to one embodiment, the separating station can further comprise drive means for rotating said girder structure.

According to one embodiment, the separating station can further comprise a collecting unit for receiving the separated infill material.

Such a design of the separating station is advantageous in that it allows the infill material to be collected and, for instance, recycled or reused.

According to one embodiment, the apparatus can further comprise a removing station, which is arranged to remove the artificial turf, when arranged on a base, by lifting from the base a strip of the artificial turf extending in a longitudinal direction and a winding station for winding the strip onto a shaft.

The apparatus according to the invention ensures that the artificial turf can be removed in a very simple, smooth and cost-effective manner.

According to one embodiment, the removing station can be arranged to deflect said strip from the base.

According to one embodiment, at least one of the removing station, the separating station and the winding station is/are adjustable between an operating position and a transport position.

This embodiment of the apparatus is advantageous in that it allows vertical and lateral adjustment of the removing station, the separating station or the winding station and also facilitates transportation of the apparatus.

According to one embodiment, the removing station can further comprise a deflecting means, which extends transversely of said longitudinal direction and which is arranged to contact the strip and to deflect said strip in such a manner that an upper side of the strip is oriented towards the base.

Such a design of the deflecting means is advantageous in that it facilitates the removal of the strip. Moreover, it ensures that the strip does not rupture during deflection by reducing the stress to which the strip is subjected. In addition, by having the strip face the base, i.e. turning the strip upside down, gravitation will contribute to separating the infill material from the strip.

According to one embodiment, the deflecting means can have a covered circumferential surface arranged to contact the strip.

By designing the deflecting means in this way the infill material will remain in the strip during deflection. This is advantageous in that the infill material will be transported with the strip to the separating station, where it can be separated from the strip.

According to one embodiment, the guide roller can be arranged downstream of the removing station.

According to one embodiment, the shaft onto which the strip is to be wound can be rotatable.

Such a design of the shaft is advantageous in that it ensures that the strip is wound onto the shaft. Moreover, it can provide displacement of the apparatus along said longitudinal direction.

According to one embodiment, the apparatus can further comprise a sleeve adapted for mounting on the shaft.

Such a design is advantageous in that it allows replacement of the sleeve adapted for mounting on the shaft.

According to one embodiment, said sleeve can comprise fastening means for fastening of the strip.

Such a design is advantageous in that the strip can be attached to the sleeve, which facilitates the winding of the strip onto the sleeve.

According to one embodiment, the apparatus can be mobile.

Such a design is advantageous in that the apparatus can move along and across the artificial turf during the removal of the same. Moreover, the apparatus can be used to carry the artificial turf away.

According to the present invention, it is further suggested a method for removing an artificial turf arranged on a base, comprising lifting from the base a strip of the artificial turf extending in a longitudinal direction, separating infill material from the strip and winding the strip onto a shaft. The step of separating infill material from the strip comprises passing the strip over a guide roller to allow the infill material to be separated from the strip by means of gravitation, and at least one of the steps of separating infill material from the strip by means of air jets, separating infill material from the strip by means of a brush means engaging with the upper side of the strip and separating infill material from the strip through mechanical engagement with the underside of the strip.

The method according to the invention ensures that the artificial turf can be removed in a very simple, smooth and cost-effective manner.

The inventive separation of the infill material from the strip is particularly advantageous if the infill material is moist or if the artificial turf is of the type having divisible grass filaments.

According to one embodiment, an upper side of the strip can be oriented towards the base when said separation is performed.

This is advantageous in that it facilitates the separation of the infill material from the strip, since gravitation helps to separate the infill material from the strip.

According to one embodiment, the method can further comprise separating, by means of a disengaging device and prior to the step of lifting from the base a strip of the artificial turf extending in a longitudinal direction, strips of the artificial turf from each other and from adhesive strips arranged underneath said strips of the artificial turf.

This is advantageous in that it facilitates the removal of the artificial turf.

BRIEF DESCRIPTION OF THE DRAWINGS

Embodiments of the present invention will be described below for the purpose of exemplification, reference being made to the accompanying drawings.

DETAILED DESCRIPTION

Figure 1:
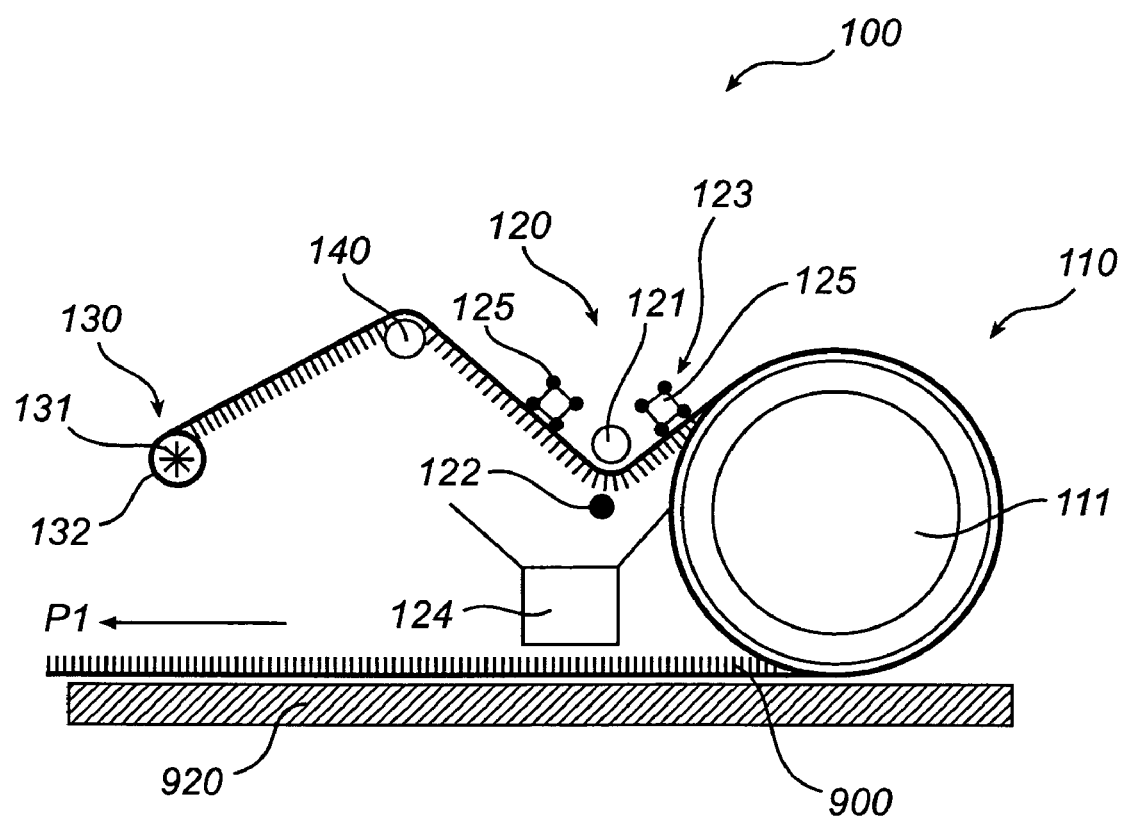
FIG. 1 is a schematic side view of an embodiment of an apparatus for handling an artificial turf arranged on a base.

FIG. 1 illustrates schematically an embodiment of an apparatus 100 for handling an artificial turf arranged on a base 920. The apparatus 100 comprises a removing station 110 for lifting from the base 920 a strip 900 of the artificial turf extending in a longitudinal direction P1. The apparatus further comprises a separating station 120 for separating infill material from the strip 900. The apparatus also comprises a winding station 130 for winding the strip 900 onto a shaft 131. The removing station 110, separating station 120 and winding station 130 can be mounted on a common frame structure. At least one of the removing station 110, the separating station 120 and the winding station 130 is/are adjustable between an operating position and a transport position. The stations 110, 120, 130 can be, for example, vertically adjustable or retractable and extendable.

The removing station 110 comprises a deflecting means 111, which extends transversely of said longitudinal direction P1 and which is arranged to contact the strip 900 and to deflect said strip 900 in such a manner that it is turned upside down, i.e. an upper side of the strip is oriented towards the base 920.

The deflecting means 111 has a covered circumferential surface arranged to contact the strip 900. This is advantageous in that the infill material remains in the strip 900 during deflection and is transported with the strip to the separating station 120, where it can be separated from the strip 900.

As in the embodiment shown, the deflecting means 111 can be a drum. As in the embodiment shown, the drum can be arranged to support at least part of the apparatus. As in the embodiment shown, the drum can be covered, which is advantageous since the cover helps to contain the infill material in the strip 900 during deflection.

Figure 2:
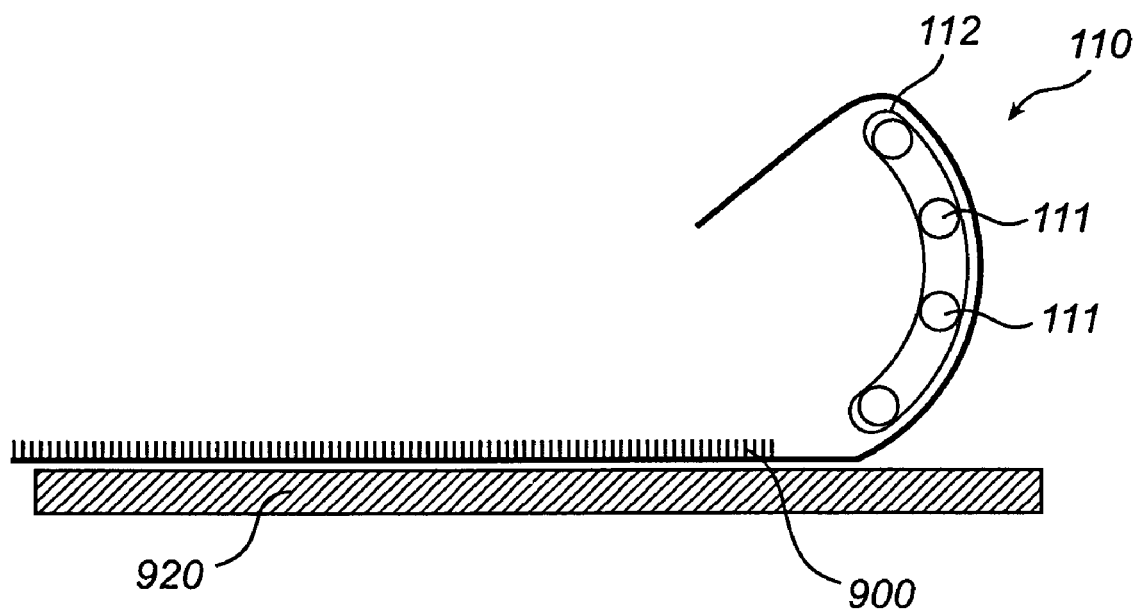
FIG. 2 is a schematic side view of an embodiment of a removing station of the apparatus.

In one embodiment, the deflecting means 111 can be a plurality of guide rollers. These guide rollers can be located, for instance, at the same radial distance from a central point, such that the strip 900, when passed over the guide rollers, follows a substantially semicircular path, see FIG. 2. An advantage of having a plurality of guide rollers is that the apparatus 100 can be made shorter by using the space for the removing station 110 in a more effective manner. A shorter apparatus 100 is advantageous when driving or transporting the apparatus 100. As in the embodiment shown, the guide rollers can have a covered circumferential surface 112, which is advantageous since the circumferential surface helps to keep the infill material in the strip 900 during deflection. The circumferential surface 112 can be provided, for example, in the form of an endless belt.

The separating station 120 comprises a guide roller 121, which is arranged downstream of the removing station 110. The strip 900 is passed over the guide roller 121 in a manner that allows the infill material to be separated from the strip 900 by means of gravitation. The strip 900 is passed over the guide roller 121 in such a manner that the portion of the strip 900 that at any given moment contacts the guide roller 121 is opened up, i.e. the filaments of the strip 900 are angled away from each other allowing the infill material to fall from the strip 900 under the influence of gravitation. The dislodging of the infill material occurs in the position where the strip 900 is passed over the guide roller 121. The guide roller 121 can be vertically adjustable to set the degree to which the strip 900 is opened up.

The separating station 120 further comprises nozzles 122 for directing air jets at the guide roller 121. The air jets facilitate the separation of infill material as the strip 900 is passed over said guide roller 121.

The nozzles 122 are longitudinally spaced along a pipe, which may have a length corresponding to the width of the strip 900. The pipe can be horizontally and vertically adjustable. This adjustability is advantageous in that it facilitates optimization of the distance to the strip 900 being passed over the guide roller 121 and the blowing angle formed therewith. Moreover, the output of the air jets can be adjustable. This is advantageous since the output of the air jets can be adapted to the type of infill material and also to its consistency, for example a higher output may be required if the infill material is moist. It is also possible to adapt the output of the air jets to the type of artificial turf used. The air jets can be shut off, which may be advantageous, for example, if the infill material is dry sand, since the air jets may not be needed to facilitate the separation of the infill material from the strip 900. The air jets can be compressed air produced by a compressor.

The separating station 120 further comprises engagement means 123 for separating infill material through mechanical engagement with the strip 900. The engagement means 123 can be operated, for example, by a hydraulic motor.

The engagement means 123 can comprise at least one rotatably arranged girder structure 125 extending transversely of said longitudinal direction P1 and, in the embodiment shown, the engagement means 123 comprises two such girder structures 125. In this embodiment, each girder structure 125 consists of a square section with a round bar welded to each corner. Each girder structure 125 is arranged at such a distance from the path along which the strip 900 travels that at least the corners of the girder structure 125 can be brought in contact, in a cyclic manner, with the strip 900 during rotation of said girder structure. The apparatus 100 further comprises drive means (not shown) for rotating the girder structures 125. By rotating said girder structures 125, a shock force is repeatedly applied to the strip 900. The repeated application of a shock force on the strip 900 creates vibrations in the strip 900. This is advantageous in that it contributes to dislodging the infill material from the strip 900.

The speed at which the girder structure rotates 125 can be variable. This is advantageous since the speed can be adapted to the type of infill material and also to its consistency, for example a higher speed may be required if the infill material is moist. Moreover, the speed can be adapted to the type of artificial turf.

In one alternative embodiment, the engagement means 123 can comprise at least one girder structure extending transversely of said longitudinal extension P1, the girder structure being arranged to move between a first and a second position. The first position can be located at a distance from the strip 900. The second position can be located on the strip, so that when the girder structure moves between the first position and the second position, a striking force acts on the strip 900. The repeated application of a striking force on the strip 900 creates vibrations in the strip 900. In this case too, dislodging of the infill material from the strip 900 is achieved.

In the embodiment shown, the girder structure 125 has, as mentioned above, a square shape. It will be appreciated that also other shapes are possible, such as a circular, triangular, five-sided, six-sided shape.

The movement of the girder structure 125 can be adjustable to enable setting of the pressure, intensity and frequency with which the girder structure 125, and its corners, strike the strip 900.

The separating station 120 can comprise brush means for separating infill material through engagement with the strip 900. The brush means can be operated, for example, by a hydraulic motor. The brush means is arranged to engage with the upper side of the strip 900. This is advantageous in that it contributes to dislodging infill material from the strip 900. In one embodiment, the engagement of the brush means with the upper side of the strip 900 can consist in the brush means brushing the upper side of the strip 900. The brush means can consist of at least one brush.

The brush means is arranged adjacent to the guide roller 121. The brush means can be arranged, for example, downstream or upstream of the guide roller 121. Alternatively, the brush means can be arranged immediately below the guide roller 121. It will be appreciated by the person skilled in the art that all possible combinations of brush means are conceivable; for example, one brush means may be provided downstream of the guide roller 121, one upstream of the guide roller 121 and one below the guide roller 121.

The separating station 120 further comprises a collecting unit 124 for receiving the separated infill material. The collecting unit 124 can be, for example, a conveyor belt which transports the infill material, for instance via an elevator, to a collecting vehicle for collection of the infill material. The speed of the conveyor belt is variable, which is advantageous in that it allows the speed to be adapted to the amount of infill material to be received. The conveyor belt can be provided with compartments for receiving the infill material. The compartment edges can be equipped with wings for containing the infill material inside the compartments. Moreover, the collecting unit 124 can be adjustable between an operating position and a transport position.

The shaft 131 onto which the strip 900 is to be wound can be rotatable. The apparatus 100 further comprises a sleeve 132 adapted for mounting on the shaft 131. The sleeve 132 can be locked on the shaft 131 with the aid of a ratchet mechanism. The sleeve 132 comprises fastening means for fastening of the strip 900. The fastening means can be any kind of fastener known to the skilled person, such as double-stick tape or protrusions disposed about the sleeve 132.

The shaft 131 can be vertically adjustable. Moreover, the shaft 131 can be adjustable between a transport position and an operating position. The rotational speed of the shaft 131 can be variable.

After the strip 900 has been attached to the sleeve 132, rotation of the shaft 132 is initiated. During rotation of the shaft 131, and thereby also of the sleeve 132, the strip 900 is wound onto the sleeve 132. By winding the strip 900 onto the sleeve 132, the deflecting means 111, in the form of said drum, is set in rolling motion. Thus, the shaft 132 is arranged to drive the deflecting means 111 and, as a result, the strip caused to pass over the drum will roll onto the drum, being thus deflected from the base. This also causes the apparatus 100 to move forward. This means that the apparatus 100 is mobile. When the rotational speed of the shaft 131 is varied, so is the speed of the deflecting means 111. When the rotational speed of the shaft 131 and the deflecting means 111 is varied, so is the speed at which the apparatus 100 is moving forward.

According to the embodiment shown, the apparatus 100 further comprises a guide roller 140, which is arranged between the separating station 120 and the winding station 130. The guide roller 140 can be horizontally and vertically adjustable to enable setting of the degree to which the filaments of the strip 900 should be opened up.

Figure 3:
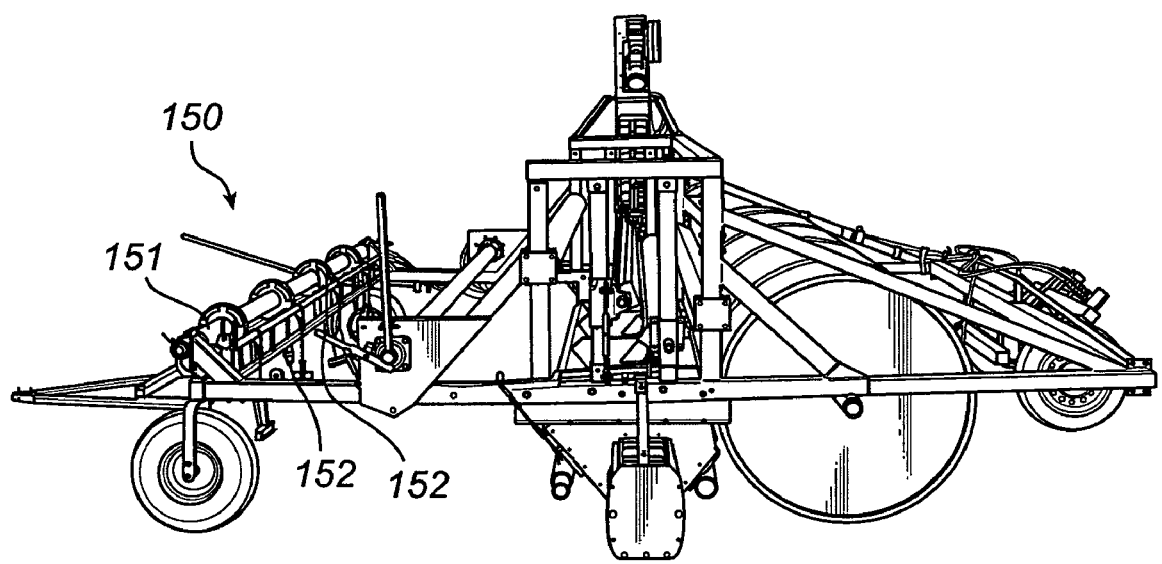
FIG. 3 is an illustration of the apparatus according to FIG. 1 from a first angle.

As shown in FIG. 3, the inventive apparatus 100 can comprise strip guiding means 150 for guiding a first strip end of the strip 900 through the apparatus 100, from the removing station 110, via the separating station 120, to the winding station 130. After the strip 900 has been guided through the apparatus 100 to said winding station 130, said first strip end is attached to the sleeve 132 in the manner described above.

The strip guiding means 150 comprises a rotatable shaft 151. A hydraulic motor is arranged to rotate said shaft 151. A plurality of rope elements 152 are connected to the shaft 151 at a radial distance from its centre of rotation. A clamping means is provided at the free end of each rope element 152. Each rope element 152 has a length such that it can be passed through the apparatus 100, from the winding station 110, via the separating station 120, to the removing station 130 along the path intended for the strip.

Figure 4:
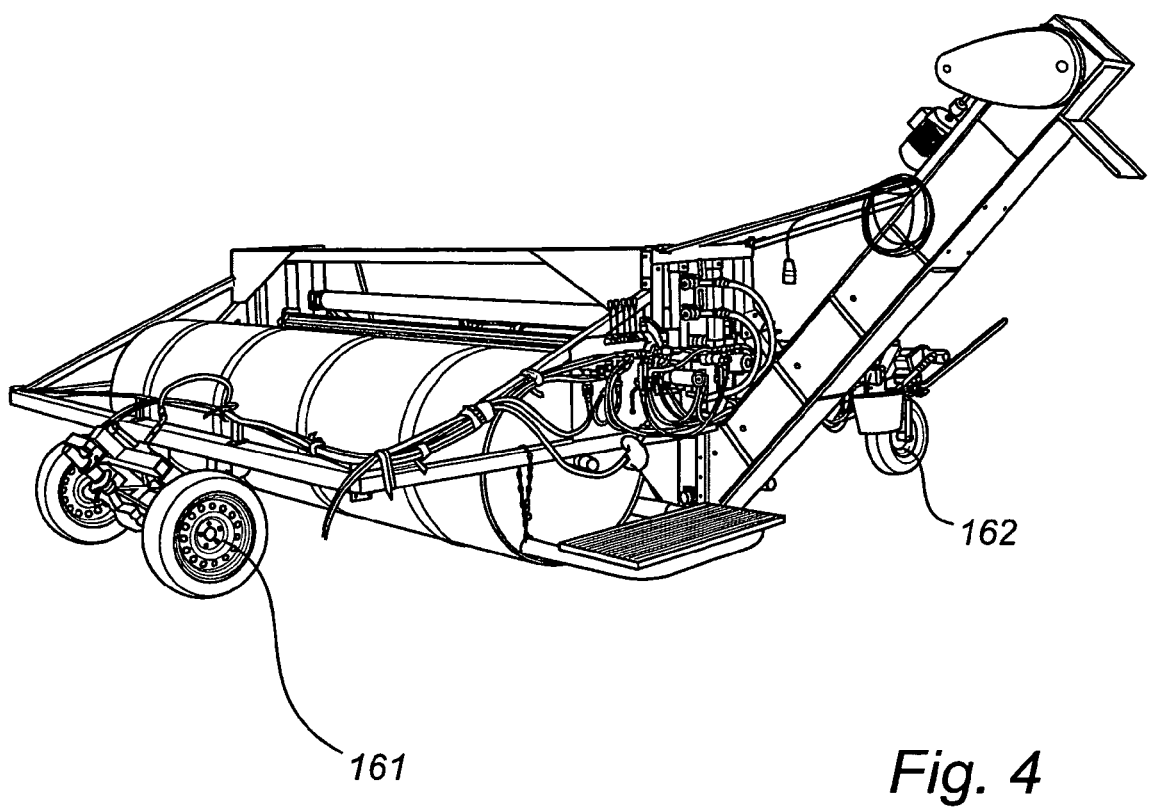
FIG. 4 is an illustration of the apparatus according to FIG. 1 from a second angle.

The apparatus 100 can comprise at least one wheel axle 161, 162 for driving of the apparatus 100, see FIG. 4, when the apparatus is not driven with the aid of the deflecting means 111. The wheel axle 161, 162 can be equipped with wheels. The wheel axle 161 is adjustable between a transport position and an operating position. The wheel axle 161, 162 can be rotated by means of, for example, a hydraulic motor.

Figure 5:
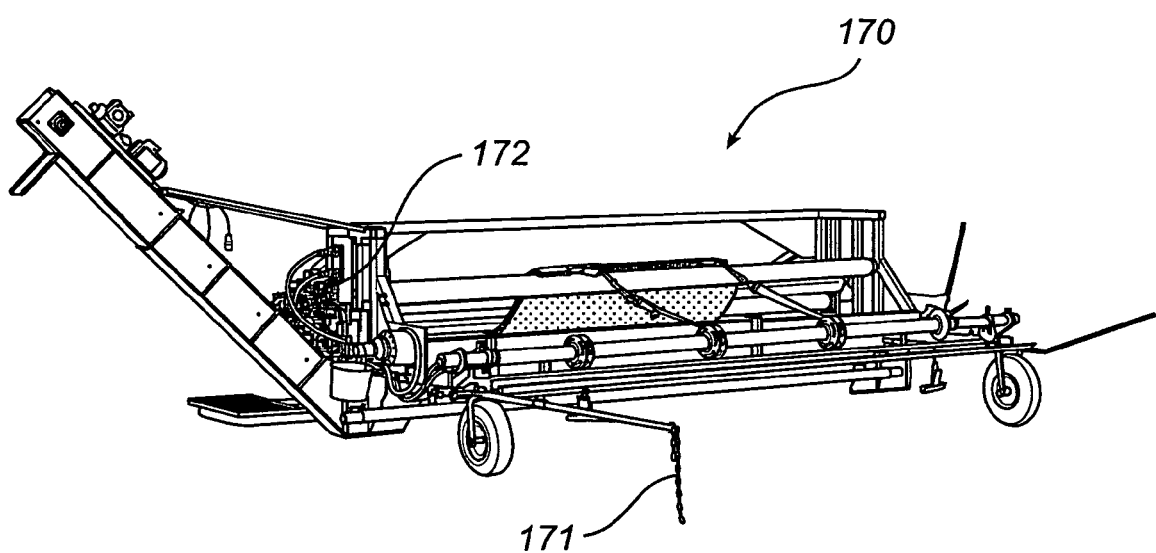
FIG. 5 is an illustration of a steering station of the apparatus in FIG. 1.

The apparatus 100 further comprises a steering station 170 for steering of the apparatus 100, see. FIG. 5. The steering station 170 can comprise a sight 171. The sight 171 can be formed, for example, of a horizontal iron pipe and a chain, which is suspended from the iron pipe at one end and hangs down with its other end towards the base 920. The sight 171 serves to facilitate the steering of the apparatus 100. When steering, the other end of the chain traces one of the longitudinal edges of the strip 900 which is to be removed and which extends in a longitudinal direction P1. In addition, the steering station 170 can comprise an operating panel 172. The operating panel 172 is used to control all the parts of the apparatus 100. The steering station 170 is used to steer the apparatus 100 when driving it using the wheel axle 161, 162.

Figure 6A:
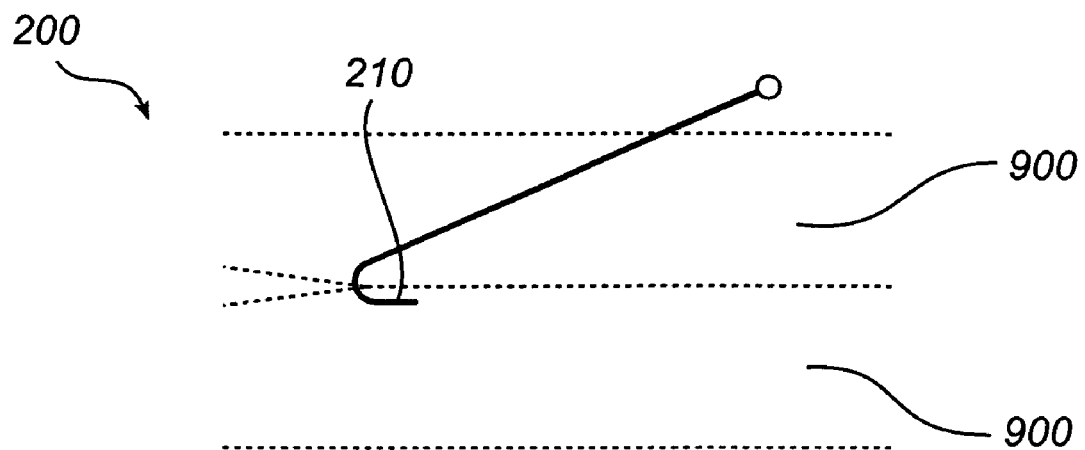
FIG. 6a is a schematic side view of an embodiment of a disengaging device for dividing the artificial turf into strips.
Figure 6B:
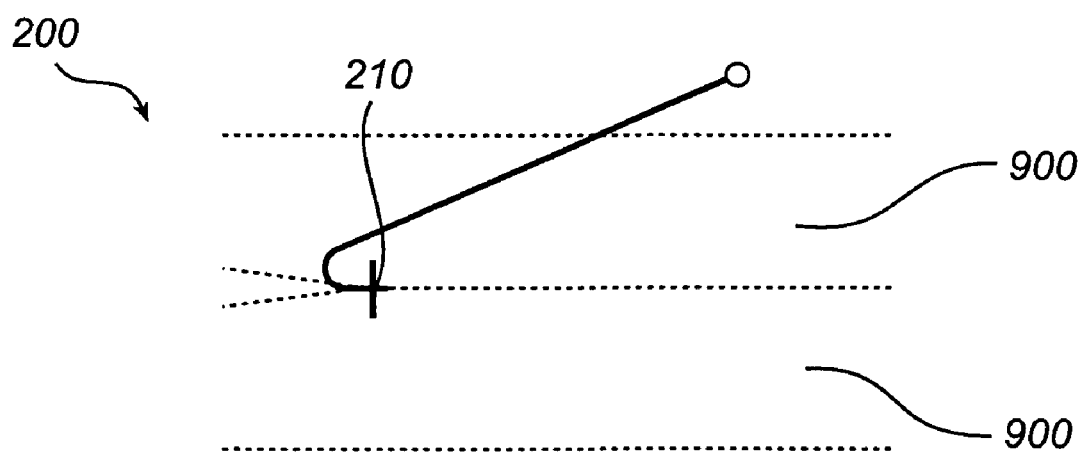
FIG. 6b is a schematic side view of an embodiment of a disengaging device for dividing the artificial turf into strips.

Before removing the artificial turf, it should be divided into strips 900. This can be done using a disengaging device 200 adapted for this purpose, see FIGS. 6A and 6B. FIGS. 6A and 6B show examples of embodiments of the disengaging device 200 and main end 210 of the same, but it will be appreciated that also other embodiments are conceivable. The main end 210 of the disengaging device is inserted between the longitudinal edges of two adjoining strips 900 and is then moved along the edges in such a manner that the strips 900 are separated from each other and detached from an adhesive strip situated underneath. Alternatively, the disengaging device 200 is moved only between the strip 900 and an adhesive strip situated underneath, such that the strip 900 is detached from the adhesive strip. A further alternative is to move the disengaging device 200 in such a manner that the adhesive strip is parted along the longitudinal edges of two adjoining strips 900. A knife, such as a utility knife, can be used as an alternative to a disengaging device 20. The utility knife has the advantage of allowing the artificial turf to be severed into strips of any optional size.

It will now be described how, according to the present invention, an artificial turf can be removed from a base.

In the case where the artificial turf is formed of strips 900 glued together on a base 920, the strips 900 are disengaged from each other and separated from each other. This can be achieved by means of the disengaging device 200 described above. Said disengaging device 200 can, for example, be operated manually. Alternatively, said disengaging device 200 can be mounted on some kind of vehicle, which moves the disengaging device 200 along the longitudinal edges of the strips 900 between the strips that have been glued together, as described above.

The inventive apparatus 100 is then applied to the current strip 900 in a position near said strip end. The strip end is then guided through the apparatus 100 along the intended path to the shaft 131 of the winding station 130. This can be achieved by means of the above mentioned strip guiding means 150, which is operated in such a manner that its rope elements 152 and the clamping means associated therewith are passed through the stations of the apparatus 100 to the removing station 110. The rope elements 152 are attached to the strip end with the aid of said clamping means. Rotation of the shaft 151 is then initiated, whereby the rope elements 152 are wound onto the shaft 151, thus causing the strip end to be moved along the intended path via the removing station 110, the separating station 120 and the winding station 130. More specifically, the strip end is passed over the deflecting means 111, the guide rollers 121 and 140 and on to the shaft 131 onto which the strip 900 is to be wound. The separating station 120 can be in operation at the same time as the strip end is being guided through the apparatus 100 along the intended path. More specifically, the rotation of the shaft 131 as well as the generation of air jets from the nozzles 122 and the movement of the engagement means 123 can all be initiated before rotation of the shaft 151 is initiated, or alternatively they can be initiated simultaneously. Moreover, the separating station 120 can be activated only after the strip end has been guided through the apparatus 100 along the intended path.

It will be appreciated that if the infill material is of a certain type, for example dry sand, the generation of air jets from the nozzles 122 and, possibly, the movement of the engagement means 123 will not be initiated. Furthermore, the collecting unit 124 for receiving the separated infill material is activated. The collecting unit 124 transports the infill material, for instance via an elevator, to a collecting vehicle for collection of the infill material.

The sleeve 132 adapted for mounting on the shaft 131 is mounted on the shaft 131 and locked on the shaft 131 by means of said ratchet mechanism. The strip end is released from the clamping means and attached to the sleeve 132 by means of a fastening means known to the skilled person.

The winding of the strip 900 onto the shaft 131 causes the apparatus 100 to move in the longitudinal direction P1, the drum 111 supporting at least part of the apparatus 100.

When the strip 900 has been wound onto the shaft 131, the strip 900 can be removed and carried away, according to one embodiment, in the following manner. The shaft 131 is set to its transport position. The wheel axle 161, 162 is set to its operating position. The apparatus 100 is driven to the desired location on the wheels of the wheel axle 161, 162 and is steered by means of the steering station 170. The sleeve 132 and the strip 900 wound onto the sleeve 132 are loosened from the shaft 131 and lifted off the same. A new sleeve 132 is then mounted on the shaft 131. Next, the inventive apparatus 100 is applied to the next strip 900 to be removed in a position near the strip end. The wheel axle 161, 162 is then set to the transport position and the strip end is guided through the apparatus 100 along the intended path according to the above.

Another way of removing the strip 900 wound onto the shaft 131 may be to lift the sleeve 132 and the strip 900 wound onto the sleeve 132 off the shaft 131 by means of some kind of wheel-loader. The wheel-loader then carries the strip 900 away. Next, the wheel axle 161, 162 is set to the operating position and the inventive apparatus 100 is applied to the next strip 900 to be removed in a position near the strip end.

Finally, the wheel axle 161, 162 is set to the transport position and the strip end is guided through the apparatus 100 along the intended path according to the above.

It will be appreciated that the present invention is not limited to the embodiments described above. Several variations and modifications are thus conceivable and, therefore, the scope of the present invention is defined solely by the appended claims.

The invention claimed is:

1. An apparatus for handling an artificial turf, comprising:
   a separating station to separate infill material from the artificial turf, the separating station including
      a guide roller over which a strip of the artificial turf is to be passed to allow the infill material to be separated from the strip by way of gravitation, and the separating station including each of:
      an engagement device to separate infill material from the strip through mechanical engagement with the strip, the engagement device including at least one rotatable girder structure adjacent to the guide roller and arranged to rotatably engage with the underside of the strip to cause the infill material to dislodge, and
      nozzles to separate infill material from the strip, the nozzles being positioned adjacent to the guide roller and being arranged to direct air jets at filaments of the strip that are forcibly angled away from each other, the filaments being located on a side opposite the underside of the strip.

2. An apparatus as claimed in claim 1, wherein the guide roller is arranged to act on the strip, such that a portion of the strip that, at any given moment contacts the guide roller, is opened up, wherein filaments of the strip are angled away from each other allowing the infill material to fall from the strip under the influence of gravitation.

3. An apparatus as claimed in claim 1, wherein the engagement of the guide roller with the strip is adjustable to enable setting of the degree to which the strip is opened up.

4. An apparatus as claimed in claim 1, wherein the separating station further includes a collecting unit to receive the separated infill material.

5. An apparatus as claimed in claim 1, further comprising:
   a removing station, arranged to remove the artificial turf, when arranged on a base, by lifting from the base a strip of the artificial turf extending in a longitudinal direction; and
   a winding station to wind the strip onto a shaft.

6. An apparatus as claimed in claim 5, wherein the removing station is arranged to deflect said strip from the base.

7. An apparatus as claimed in claim 5, wherein at least one of the removing station, the separating station and the winding station is adjustable between an operating position and a transport position.

8. An apparatus as claimed in claim 5, wherein the removing station comprises a deflecting device, which extends transversely of said longitudinal direction and which is arranged to contact the strip and to deflect said strip in such a manner that an upper side of the strip is oriented towards the base.

9. An apparatus as claimed in claim 8, wherein the deflecting device includes a covered circumferential surface arranged to contact the strip.

10. An apparatus as claimed in claim 5, wherein the guide roller is arranged downstream of the removing station.

11. An apparatus as claimed in claim 5, wherein the shaft onto which the strip is to be wound is rotatable.

12. An apparatus as claimed in claim 5, wherein said apparatus is mobile.

13. An apparatus as claimed in claim 1, wherein the guide roller is adapted to engage the underside of the strip, such that a portion of the strip that contacts the guide roller is opened up such that filaments of the strip are angled away from each other allowing the infill material to fall from the strip under the influence of gravitation and the nozzles are arranged to direct air jets at the filaments that are angled away from each other.

* * * * *